Figure 1:
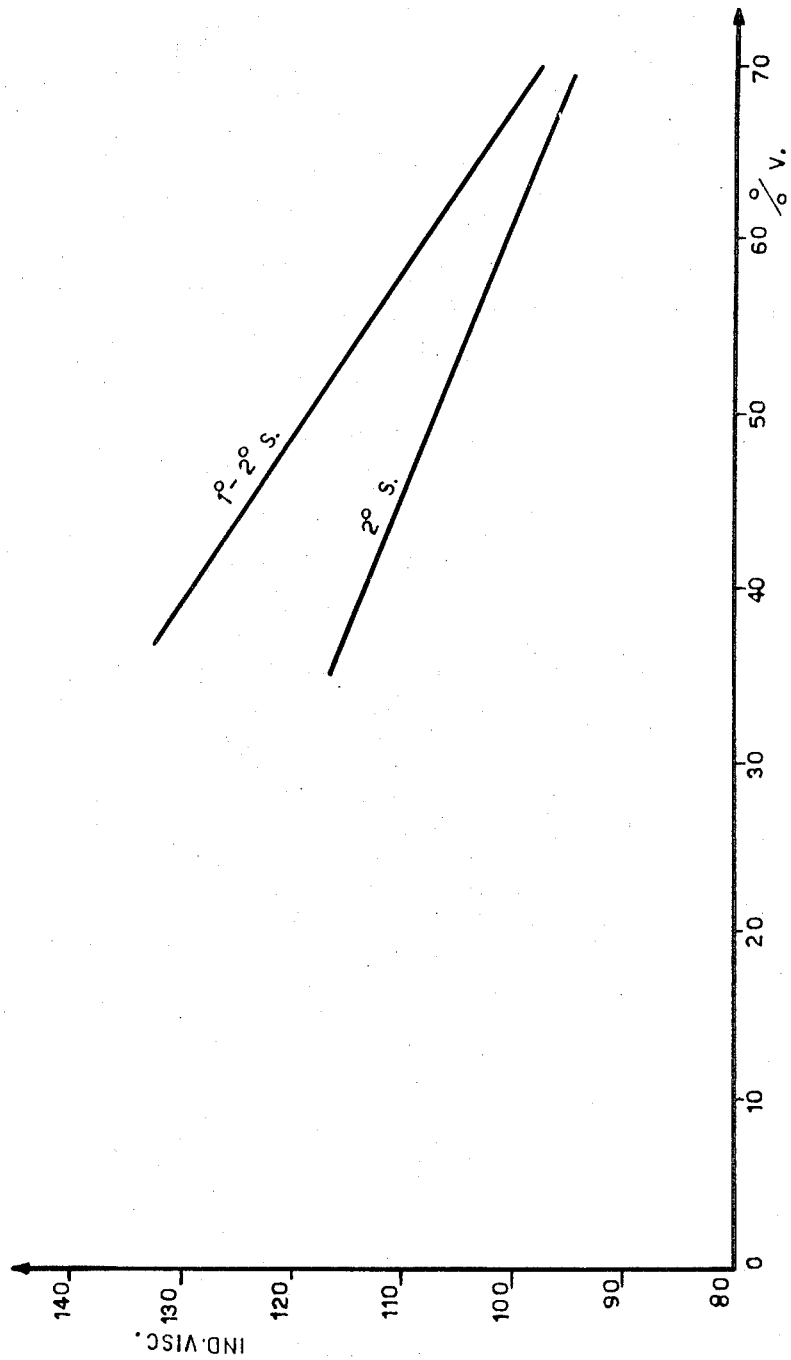

United States Patent
Girotti et al.

[15] 3,642,612
[45] Feb. 15, 1972

[54] PROCESS FOR THE CATALYTIC HYDROGENATION OF HYDROCARBONS FOR THE PRODUCTION OF HIGH-VISCOSITY-INDEX LUBRICATING OILS

[72] Inventors: Pierleona Girotti; Telemaco Floris, both of Donato Milanese; Giancarlo Pecci, Milano, all of Italy

[73] Assignee: Snam Progetti S.p.A., Milan, Italy

[22] Filed: Feb. 14, 1969

[21] Appl. No.: 799,341

[30] Foreign Application Priority Data

Feb. 14, 1968   Italy..................................12716 A/68

[52] U.S. Cl..........................208/89, 208/143, 208/254 H
[51] Int. Cl..........................................................C10g 23/00
[58] Field of Search..................208/143, 212, 89, 58, 59, 61, 208/72, 104

[56] References Cited

UNITED STATES PATENTS

| | | | |
|---|---|---|---|
| 3,147,210 | 9/1964 | Hass et al. | 208/210 |
| 3,132,087 | 5/1964 | Kelley et al. | 208/59 |
| 3,239,447 | 3/1966 | Reeg et al. | 208/59 |
| 3,287,254 | 11/1966 | Paterson | 208/89 |
| 3,308,054 | 3/1967 | Duir et al. | 208/89 |
| 3,364,131 | 1/1968 | Watkins | 208/59 |

*Primary Examiner*—Delbert E. Gantz
*Assistant Examiner*—G. J. Crasankis
*Attorney*—Ralph M. Watson

[57] ABSTRACT

A novel two-stage hydrogenation process for producing lubricating oils is disclosed which comprises passing a deasphalted vacuum residue and/or vacuum distillate feedstock through a preheater, contacting the resulting feedstock with a catalyst consisting of sulfides and/or oxides of the VI and VIII group metals on a slightly acid support in the presence of hydrogen at certain temperature, pressure, space velocity and hydrogen flow conditions (first stage), contacting the resulting product under the same temperature, pressure, space velocity and hydrogen flow conditions as in the first stage with a catalyst consisting of sulfides and/or oxides of the VI and VIII group metals on an acid support, conveying the resulting products to a high-pressure separator where hydrogen is removed, purified and recycled, conveying the resulting product to a low-pressure separator where undesirable gases are removed, introducing the resulting product into a stripping column, where certain useful byproducts are removed, transferring the bottom products to a deparaffination unit wherein paraffins removed therein are recycled to the first reaction stage and then conveying the deparaffinated product to a vacuum-fractionating column where the desired lubricating oils are obtained.

10 Claims, 3 Drawing Figures

PROCESS FOR THE CATALYTIC HYDROGENATION OF HYDROCARBONS FOR THE PRODUCTION OF HIGH-VISCOSITY-INDEX LUBRICATING OILS

This invention relates to a process for the catalytic hydrogenation of hydrocarbon feedstocks and in particular to the production of high viscosity index lubricating oils.

It is known that lubricating oils are obtained from hydrocarbons by extraction with a selective solvent such as phenol. Also well known are catalytic hydrogenation processes that make it possible to get said lubricating oils from high-boiling feedstocks fractions as for instance in the process described in U.S. Pat. No. 2,554,281 where a catalyst, consisting of one or more sulphides of VI and VIII group metals of the periodic system, is employed for said hydrogenation.

It has now been found that high viscosity index oils may be prepared by means of a particular process of catalytic hydrogenation of deasphalted petroleum feedstocks and/or of vacuum distillates and that such a process also makes it possible also to obtain both higher yields and the production of other products such as jet fuels and high-quality feedstocks for catalytic reforming.

Particularly it has been observed that better results are achieved if in the aforementioned process the catalytic hydrogenation zone is divided in two stages each one of them utilizing different catalytic systems and suitable operative conditions.

In the first of the above-cited stages the following basic reactions occur:
desulfurization,
denitrification,
of partial hydrogenation polycyclic aromatics,
carbon residue reduction.

The operative conditions are regulated in such a way to eliminate cracking reactions as much as possible.

In the second stage the following basic reactions occur:
completion of the hydrogenation reaction of the polycyclic aromatic hydrocarbons,
selective splitting of the polycyclic naphthenic compounds to yield lower naphthenes comprising side-branched paraffin radicals,
linear paraffins isomerization,
selective hydrocracking for low-boiling isoparaffins.

In the first stage the catalyst comprises oxides and or sulphides of VI and of VIII group metals of the periodic system carried on a slightly acid support as alumina.

In the second stage the oxides and or the sulphides of the metals of VI and VIII group have an acid support as for instance silica-alumina.

The preferred feedstocks are the following: deasphalted residue and/or vacuum distillate of any source and limitless as far as the sulphur and the nitrogen content is concerned. The ratio between the deasphalted vacuum residue and the vacuum distillate will be selected and a function of the type and the quality of the desired products.

On the whole, for the production of oils with a viscosity index of about 100 it is possible to start preferably from a mixture of deasphalted vacuum residue and vacuum distillate, while for the production of multigrade lubricating oils preferably may be used a deasphalted vacuum residue alone or occasionally with the addition of vacuum distillate.

With the process according to the present invention it is possible to obtain lubricating oils having viscosity indexes ranging between 90 and 145 by varying the operative conditions, the characteristics of the feedstocks and the ratio of the contact time in the two stages.

Depending on the selected feedstocks and operative conditions the following byproducts are obtained in variable amounts:
1. motor gas oil with an high Diesel Index and a very low pouring point;
2. Jet fuels with high qualitative characteristics as a low content of aromatics and a very low pouring point;
3. Naphtha for reforming feedstocks with an high naphthenic content, particularly suitable for producing aromatics as toluene and xylenes;
4. Light lubricating oils to be used for instance as hydraulic oils;
5. Very good paraffins.

The use of a first stage, where a catalyst with the characteristics described before is employed, allows better working conditions in the second stage since on the catalyst of said second stage arrives a denitrated, desulfurized and partially hydrogenated feedstock and therefore more suitable to be subjected to the following steps.

Moreover, since the majority of the exothermic reactions occur in the first stage the catalyst of the second stage is subjected to a lesser thermal shock, this fact being a positive factor for a better selectivity in the typical reactions of this stage. The application of the two stages, each one having a well-defined activity allows one to adjust the catalytic system to feedstocks with different characteristics by varying, suitably, as aforesaid, both the operative conditions and the amounts of the two different catalysts.

An example of the process comprises the following steps: hydrogenating treatment in two stages, as said before, stripping, deparaffination and vacuum distillation.

In the hydrogenating treatment the flow course with respect to the reactor may be both upward and downward, the two stages having the possibility to be comprised either in a single reactor or in two reactors or in more reactors arranged in series.

The deparaffination may be carried out according to any one of the conventional method as for instance by means of the formation of adducts with urea or by means of solvents as propane, methyl ethyl-ketone a.s.o.

In the reaction zone besides the recycle of the necessary hydrogen, a recycle of products may be provided substantially with the purpose to control in a better way the thermal phenomena. The paraffin coming out from the deparaffination unit may be introduced again in the process cycle.

The upward flow of the feed in place of the downward one is preferable because it makes it possible to work at a lower temperature when the space velocity is equal and at a higher space velocity when is equal to the temperature. On the other hand it has been observed that with an upward flow major selectivity is obtained, namely a higher yield with an equal viscosity index.

The possibility of working independently in each one of the two stages either under the same operative conditions or under different ones allows, as already reported before, to obtain results otherwise impossible to achieve.

The operative conditions of both stages are comprised between the following values: temperature ranging between 350° and 450° C., pressure ranging between 50 and 500 kg./cm.$^2$ space velocity ranging between 0.1 and 5 v./v./hr. The $H_2$ introduced with respect to 1 liter of feedstock being 150–2,000 N 1/1.

Figure 3:
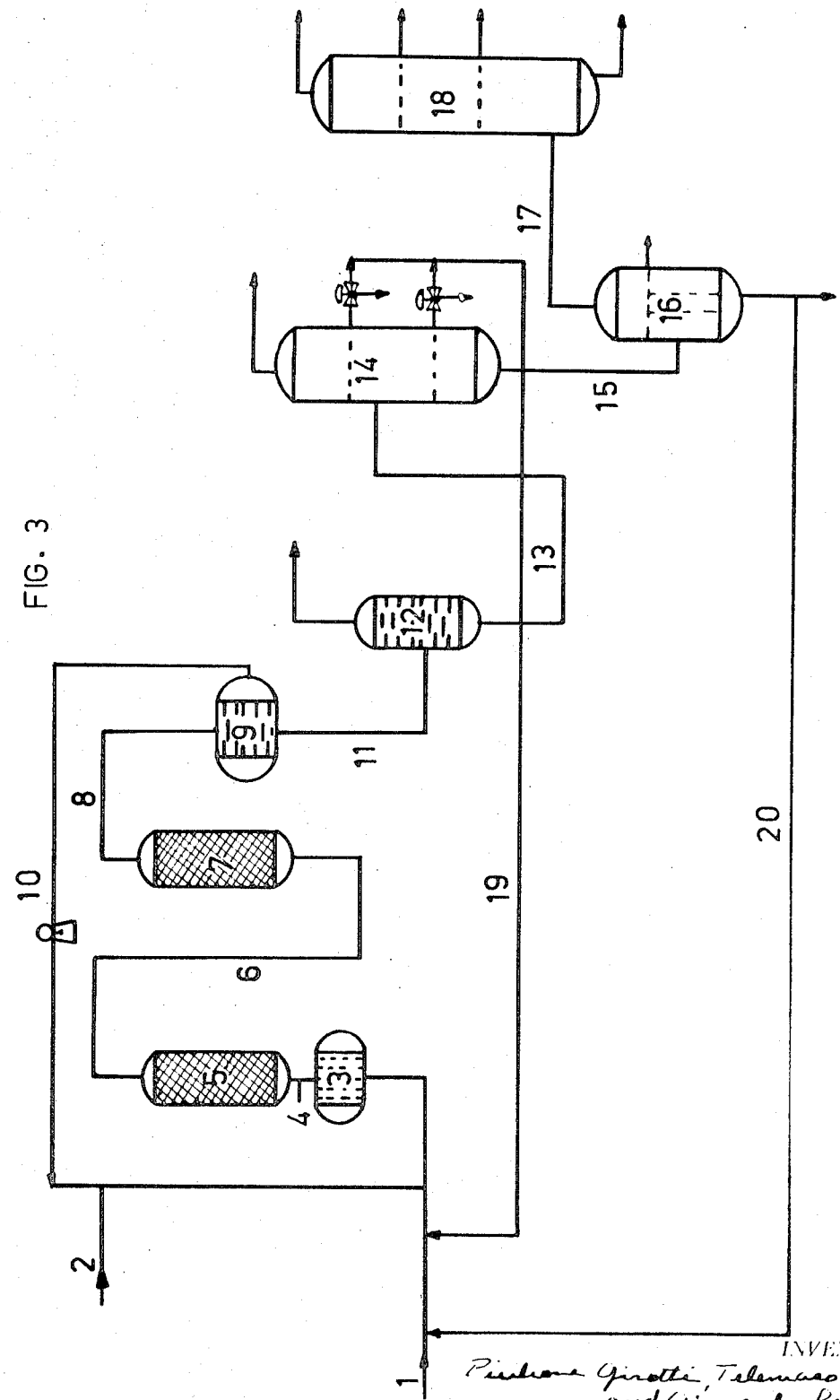

In FIG. 3 is reported with an illustrative purpose, but without intention to limit this invention, an outline of the process. The feedstock by means of line 1, together with the hydrogen of the recycle and with the one which enters through 2 and which is necessary to complete the $H_2$/feedstock ratio, is sent to a preheater 3, then through 4 enters from the bottom into the system of reaction and precisely into the first stage 5 where it meets the catalyst carried on the aforementioned slightly acid support, then the products flow by means of conduit 6, and always from the bottom, into the second stage of reaction 7 containing the catalyst with an acid support where the hydrogenation reactions are completed.

The products through 8 are transferred into a high-pressure separator 9 and therefrom via line 10 the hydrogen is separated which after depuration is recycled to the reaction zone.

The reaction product is conveyed through conduit 11 into a low-pressure separator 12 wherefrom undesirable gases are partially removed, then said reaction product is introduced into a stripping column 14 via line 14, in said stripping column are removed gas, gasoline and gasoil, having the last two products, or according to the case only one of them, the possibility of being recycled to the reaction zone through line 19 and line 1.

The bottom product is passed from stripping column, via line 15, to the deparaffination unit 16 wherein paraffin is removed either by means of methyl-ethyl-ketone or according to different known technics.

From 16 a part or the whole paraffin is recycled to the reactor through lines 20 and 1. The deparaffinated product is forwarded via line 17 to the vacuum-fractionating column 18, wherein are obtained, as overhead product, a light lubricating oil and from the medium fractions and the bottom ones the wished lubricating oils.

The invention will be more clearly illustrated by the following examples as far as its advantages and its meaning are concerned.

EXAMPLE 1

With the purpose to evaluate the difference existing between a process with a single stage and a process with two stages comparative tests have been carried out with a feedstock constituted by a deasphalted Kuwait residue having the following characteristics:

| | |
|---|---|
| Specific gravity at 15° C. | 0.9353 |
| Viscosity at 37.8° C. cSt | 762 |
| Viscosity at 98.9° C. cSt | 35.72 |
| Viscosity Index (ASTM D 567) | 84.1 |
| Sulfur percent by weight | 3.12 |
| Pouring point temperature in °C. | +43 |

TABLE I

Feedstock: Kuwait deasphalted vacuum residue with cst. viscosity at 98.9 = 35.72

| | Process with— | | | |
|---|---|---|---|---|
| | Single stage | | Two stages | |
| Tests | A | B | $A_1$ | $B_1$ |
| Operative conditions: | | | | |
| Pressure kg./cm.$^2$ | 200 | 200 | 200 | 200 |
| Temperature, ° C | 400 | 410 | 390 | 400 |
| Space velocity, v./v./h | 0.5 | 0.5 | 0.5 | 0.5 |
| Recycle of H$_2$N, l./l | 840 | 840 | 840 | 840 |
| Characteristics of the 385+ fraction: | | | | |
| Yield percent by volume | 61 | 45 | 64.3 | 57.2 |
| Specific gravity at 15° C | 0.8950 | 0.8753 | 0.8782 | 0.8642 |
| Viscosity at 37.8° C. cst | 251.2 | 91.90 | 140.4 | 88.30 |
| Viscosity at 98.9° C. cst | 20 | 10.92 | 13.89 | 10.59 |
| Viscosity index (ASTM D-567) | 99.5 | 111 | 103.1 | 110.7 |
| Pouring point temperature (° C.) | −2 | −10 | −13 | −10 |
| Characteristics of: | | | | |
| (a) Gasoil 180-350 fraction: | | | | |
| Diesel index | | | 60 | 65 |
| Pouring point temperature, ° C | | | −50 | −50 |
| (b) Kerosene 160-250 fraction: | | | | |
| Smoke point | | | 30 | 33 |
| Freezing point (° C.) | | | −65 | −65 |
| (c) Gasoline C$_7$ (180° C.): | | | | |
| Naphthenes, percent by volume | | | 62 | 63 |
| Aromatics, percent by volume | | | 15 | 10 |

The catalysts employed in the two stages process consisted in the first stage of nickel-molybdenum sulphides supported on alumina and in the second stage nickel-tungsten sulfides on silica-alumina and in the single stage process nickel and tungsten sulphides on silica-alumina.

The operative conditions employed were:

| | |
|---|---|
| Pressure | 200 kg./cm.$^2$ |
| Temperature ranging | from 300 up to 410° C. |
| Space velocity | 0.5 v./v./h. |
| Hydrogen flow | 843N l./l. of feedstock |

The hydrogenated product coming out from the low-pressure separator was fractionated into one fraction ranging from the initial point up to 385° C. and another one having boiling point higher than 385° C. (385+°C.).

The characteristics and the percent by volume yields of the fraction 385+°C. deparaffinated at −17.8° C. are reported in Table 1 and comparatively in the graph of FIG. 1 wherein the influence of the first stage on the selectivity of the hydrogenation process according to the present invention is pointed out.

The feedstock was a Kuwait deasphalted vacuum residue.

On the ordinates were plotted the viscosity indexes and on the abscissas the yield of the lubricant bases as percent by volume with respect to the feedstock.

The straight line nearest the axis of the abscissas is referred to a process with a single stage, while the one having ordinates with higher values is referred to the process having both the first and second stage.

EXAMPLE 2

The catalyst life both in the process with a single stage and in the process with two stages in series has been evaluated by working a feedstock equal to the one cited in Example 1. The catalysts employed were nickel-molybdenum sulphides on alumina for the first stage and nickel-tungsten sulphides on silica-alumina in the second stage.

The operative conditions employed were the following:

| | |
|---|---|
| Pressure | 200 kg./cm.$^2$ |
| Hydrogen flow | 843 N l./l. of feedstock |

The increments of temperature, required for obtaining a fraction having a boiling point higher than 385° C., deparaffinated at −17.8° C. and with a constant viscosity index in function of the catalyst life, given as volume of feedstock for volume of catalyst, are reported for both cases in Table 2.

TABLE 2

Increment of temperature required for maintaining constant the viscosity index of the oil bases produced. The feedstock was always the one cited in the Example 1.

| | Catalyst life | |
|---|---|---|
| Feedstock vol./catalyst vol. | Single stage process, T., ° C. | Two stages, T., ° C. |
| 0 | 0 | 0 |
| 25 | 5 | 1 |
| 50 | 10 | 2 |
| 75 | 13 | 25 |
| 100 | 15 | 3 |

EXAMPLE 3

With the purpose to evaluate the influence of the flow diagram on the process selectivity, a feedstock equal to the one used in the Example 1 was treated by entraining it both with a downward flow and with an upward flow in a two stages reactor embodied according to the invention, the first stage being always with a catalyst consisting of nickel and molybdenum sulphides on alumina and the second one with a catalyst consisting of nickel and tungsten sulphides on silica-alumina.

The operative conditions employed were in both cases the following:

| | |
|---|---|
| Pressure | 200 kg./cm.$^2$ |
| Temperature | 410° C. |
| Space velocity ranging | from 0.25 up to 0.5 v./v./h. |
| Hydrogen flow | 843 N l./l. of feedstock |

The hydrogenated product coming out from the low-pressure separator was fractionated into two fractions the first ranging from the I.P. (initial point) up to 385° C. and the second one having a boiling point higher than 385° C.

Figure 2:
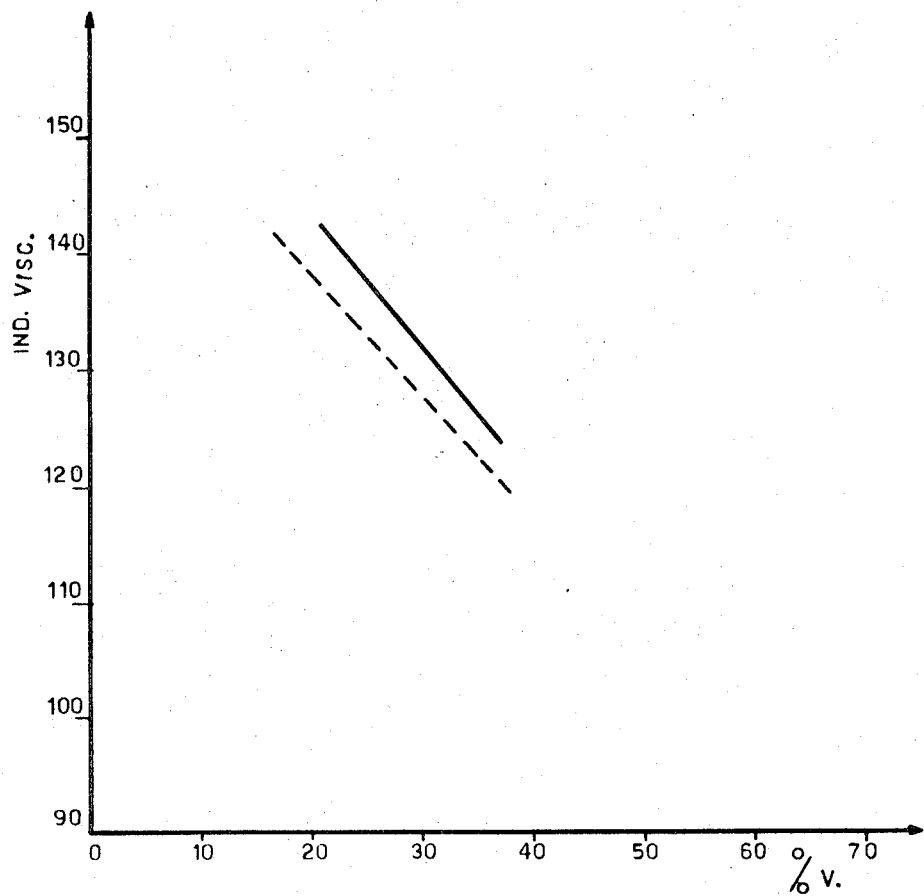

The yields in percent by volume, in function of the viscosity index of the deparaffinated fraction having a boiling point higher than 385° C., were plotted in the graph of FIG. 2, wherein is pointed out the influence of the flow diagram on the hydrogenation process selectivity according to this invention. The feedstock was the same mentioned in the Example 1. On the ordinates are plotted the viscosity indexes, while on the abscissas axis are plotted the yield of the lubricating bases given as percent by volume with respect to the feedstock.

The dashed straight line refers to the process having a downward flow of the feedstock and the continuous straight line refers to the process with an upward flow of the feedstock.

What is claimed is:

1. Process for the production of mixtures of lubricating oils with viscosity index ranging between 90 and 145, motor gas oils with a high Diesel Index and a very low pouring point, jet fuels with a low content of aromatics and very low pouring point, naphtha suitable for reforming feed at high naphthenic content, light lubricating oils and paraffins, which comprises introducing a deasphalted vacuum residue and/or vacuum distillate together with hydrogen, after initial passage through a preheater into a first stage of reaction which contains a catalyst comprising sulphides and/or oxides of a Group VI metal and a Group VIII metal of the periodic system on alumina support at a temperature of 350° to 450° C., at a pressure of 50–500 kg./cm.$^2$ with a space velocity ranging from 0.1 up to 5 with a hydrogen flow of 150–2,000 N 1/1 of feedstock, passing the resulting products into a second stage of reaction which contains a catalyst comprising sulphides and/or oxides of a Group VI metal and a Group VIII metal of the periodic system on silica-alumina support, under temperature, pressure, space velocity and hydrogen flow conditions which are the same as in the first stage, passing the products coming out from the second reaction zone into a high-pressure separator for separating hydrogen, passing the reaction product into a low-pressure separator to separate gaseous impurities and low-boiling paraffins, introducing the reaction product from said low-pressure separator into a stripping column to remove gasoline, jet fuel and gasoil passing the bottom product from said stripping column to a deparaffination unit to solvent extract waxy paraffins, and the deparaffinated product is sent to a vacuum-fractionating column to obtain said lubricating oil products.

2. Process according to claim 1 characterized in that the feedstock and the hydrogen flow in the reaction stages are upward.

3. Process according to claim 1 characterized in that the hydrogen and the feedstock flow in the reaction stages are downward.

4. Process according to claim 1, characterized in that both reaction stages are provided in a single reactor.

5. Process according to claim 1 characterized in that the two reaction stages are provided in two reactors arranged in series.

6. Process according to claim 1 wherein said deasphalted vacuum residue and/or vacuum distillate contain nitrogen and/or sulfur.

7. Process according to claim 1 wherein said first-stage catalyst is a mixture of nickel and molybdenum sulfides on an alumina support.

8. Process according to claim 1 wherein said second-stage catalyst is a mixture of nickel and tungsten sulfides on a silica-alumina support.

9. Process according to claim 1 wherein the hydrogen removed from the high-pressure separator is recycled to the first reaction stage after purification.

10. Process according to claim 1, wherein waxy paraffins removed from said deparaffination unit are recycled to said first reaction stage.

* * * * *